United States Patent [19]

Riggle et al.

[11] 4,346,416
[45] Aug. 24, 1982

[54] ROTARY ACTUATOR ASSEMBLY FOR DISK DRIVE HEAD POSITIONER

[75] Inventors: Charles M. Riggle, Acton, Mass.; John D. Read, Monument, Colo.; William B. Noe, Concord; Richard Winfrey, Boxborough, both of Mass.; Christopher A. Pollard, Monument; Frank W. Bernett, Colorado Springs, both of Colo.

[73] Assignee: Digital Equipment Corporation, Maynard, Mass.

[21] Appl. No.: 126,129

[22] Filed: Feb. 29, 1980

[51] Int. Cl.³ .................... G11B 21/02; G11B 5/55
[52] U.S. Cl. .................... 360/106; 360/97; 335/229; 318/687
[58] Field of Search .................... 360/106, 104–105, 360/97–99, 86, 75, 109, 130.34; 335/229, 230; 318/687

[56] References Cited

U.S. PATENT DOCUMENTS

| | | | |
|---|---|---|---|
| 4,110,802 | 8/1978 | Ho et al. | 360/106 |
| 4,139,874 | 2/1979 | Shiraishi | 360/105 X |
| 4,164,769 | 8/1979 | Kaseta et al. | 360/106 |
| 4,166,284 | 8/1979 | Daniels | 360/106 |
| 4,187,452 | 2/1980 | Knappe et al. | 335/229 |
| 4,196,456 | 4/1980 | Manzke et al. | 360/106 |
| 4,227,164 | 10/1980 | Kitahara | 335/230 |

OTHER PUBLICATIONS

IBM Journal of Research & Development, vol. 20, No. 4, pp. 389–397, Jul. 1976, by J. S. Heath.

*Primary Examiner*—John H. Wolff
*Attorney, Agent, or Firm*—Cesari & McKenna

[57] ABSTRACT

A rotary actuator assembly for positioning read/write heads in disk drive mass storage systems. The actuator assembly includes an actuator motor and one or more actuator arms secured thereto. The motor provides rotary motion of the arms, to move the heads. The stator magnet of the motor is an electromagnet wound on an arcuate core; a pair of elongate permanent magnets are attached to the rotor member, for coaction with the stator magnet. The rotor member has a U-shaped cross sectional area in a plane perpendicular to its axis of rotation; the permanent magnets are fixed to the outside, bottom corners of the U and the actuator arms are mounted across the open end of the U. The rotor is of a very small radius, to minimize inertia. The permanent magnets have a flat face facing the stator, with a channel running longitudinally down the middle, to minimize flux density variations in the permanent magnet-coil gap. The rotor balances the arm relative to the rotor's axis. The arms are of a substantially symmetrical tapered truss design, presenting low inertia; each is cantilevered to the rotor by one bolt which is passed through and pulls the arm against the rotors. Additionally, a spirol-type cylindrical spiral spring, received in a slot in the arm, prevents lateral slippage of the arm relative to the rotor. A pair of cantilevered leaf spring crash stops fixed to the stator decelerate the rotor at the ends of its range of travel.

11 Claims, 8 Drawing Figures

ROTARY ACTUATOR ASSEMBLY FOR DISK DRIVE HEAD POSITIONER

FIELD OF THE INVENTION

This invention relates to the field of digital electronic recording and, in particular, to disk drive recording systems. More precisely, the invention relates to a rotary actuator assembly for positioning the magnetic recording transducers, or heads, used in such disk drives, to position such heads over the tracks of the disk. To be even more specific, the invention relates to a rotary actuator motor and a head-supporting arm for use therewith in a head positioning assembly.

BACKGROUND OF THE INVENTION

In disk-type magnetic recording systems for digital applications, magnetic transducer elements, or heads, are used to record information onto (i.e., write) or retrieve information from (i.e., read) the disk surface or surfaces. Each storage disk comprises an annular substrate onto which is deposited a magnetic recording medium. Each disk surface is divided into several concentric, annular bands, or "tracks" each having a predetermined radial extent. Adjacent tracks are separated by an unused buffer zone. Each head is supported in close proximity to an associated disk surface by a head positioning assembly, or actuator, that supports the head near the disk surface and moves it from one radial position to another, thereby permitting use of a single head for reading and writing on multiple tracks. The positioner assembly for each head or group of heads includes an actuator arm and an actuator motor. The actuator motor moves the actuator arm, to change the position of the head with relation to the tracks on the disk. A disk drive may include a plurality of stacked disks, and one actuator motor may be used to move a corresponding number of actuator arms in unison.

Head positioning assemblies are generally of two types: (1) linear and (2) rotary. Linear positioners move the actuator arms and heads along a substantially linear path oriented along or parallel to a radius of the recording disk(s). Rotary positioners, by contrast, rotate the actuator arm(s) about a pivot point outside, but close to, the rim of the recording disk(s). This invention relates to rotary head positioners.

Reliable high speed disk memory operation requires, first, that the position of the read/write head relative to a track on the disk be maintained within extremely close tolerances; and, second, that the access time (that is, the time required to move the head from one track to another desired track) be short. The state of the art concerning the first requirement necessitates that a control system, preferably utilizing feedback, be employed to sense the deviation of the position of the head from an optimum read/write position over the track, and to generate a correction signal for driving the actuator motor. A short access time, on the other hand, requires that the moving mass and inertia of the positioner and heads be kept as small as possible. Reducing the mass leads to other problems, however, including twisting and bending of the arms as they are pivoted back and forth over the disk surface. This can lead to vibrations in the arm at or near certain resonant frequencies which are pumped by the positioner's servo system. If the resonant frequencies of the arms are too low, the vibrations can cause large amplitude motions to be excited which, in turn, leads to the possibility that a head can crash into the disk or vibrate so far from its intended position as to be out of range for properly reading or writing the track. To eliminate these problems, the stiffness of the arm may be increased, thereby raising the resonant frequencies of the structure and substantially reducing the amplitude of motions induced by any vibrations that may occur at lower frequencies or by servo pumping.

With a linear positioner, the head support arm is accelerated in a straight line over the disk, usually in a radial direction. This direction of motion is also the direction of the longitudinal axis of the arm itself; hence, the arm exhibits great stiffness. By contrast, a rotary positioner accelerates the arm in a lateral direction, subjecting it to considerable bending and perhaps torsional moments. For a typical arm, bending and torsional stiffness are considerably less than axial stiffness. However, rotary positioners offer many performance advantages not found in linear positioners; hence, if a rotary arm can be made sufficiently stiff to resist bending and twisting, while still maintaining a low mass and inertia, then a superior product results.

Rotary positioners of the prior art typically consist of several arms, in spaced apart relationship, stacked one above the other, pivoted at their centers on a common pivot, with read/write heads mounted at one end and the moving coil(s) of the rotor of the actuator motor mounted at the other. The stator portion of the motor includes the permanent magnets for the actuator motor. The coil thus also acts as a counterweight to balance the heads. This configuration, however, suffers from a lack of stiffness and from excessive mass and a large moment of inertia; as such, it normally is used only on low or medium performance disk memories.

SUMMARY OF THE INVENTION

With the foregoing in mind, it is an object of the present invention to provide a rotary positioner for use in high performance, high speed disk memory units.

It is a further object of the present invention to provide a rotary positioner exhibiting high torsional and bending stiffness while maintaining low mass and low inertia.

Yet another object of this invention is to provide a rotary positioner which is inherently balanced so that servo excitations do not induce torsional or out-of-plane movements which excite low frequency resonance modes.

To these ends, a rotary actuator according to the present invention includes a new and improved actuator motor and actuator arm. In the actuator motor, the coil is integral with the stator element, and the permanent magnets are integral with the rotor element. The actuator arm is cantilevered from the rotor, which is of small diameter and very stiff design. One end of the arm is mounted to the rotor very close to the rotor's axis, with the heads being supported at the opposite end of the arm. In the cases where the array of heads does not inherently provide a balanced load on the arm, balance weights are provided. The arm is of a tapered, trussed shape which provides a very stiff support comparable in bending and torsional stiffness with a linear actuator arm, but retaining the low inertia of a rotary positioner. The cantilevered mounting of the arm to the rotor, also includes means for maintaining a plurality of stacked arms in rigid positional alignment over the range of temperatures to be encountered.

This positioner assembly is capable of substantially reducing access times from access times available in the prior art, when used with the transducer suspension of U.S. patent application Ser. No. 126,020, of John L. Spash, entitled LIGHTWEIGHT DUAL HEAD SUPPORT ASSEMBLY FOR MAGNETIC DISK DRIVES, filed on even date herewith and assigned to the assignee of the present application.

BRIEF DESCRIPTION OF THE DRAWING

For a fuller understanding of the nature and objects of the invention, reference should be had to the following detailed description, taken in connection with the accompanying drawings, in which.

DETAILED DESCRIPTION OF A PREFERRED EMBODIMENT

Figure 1:
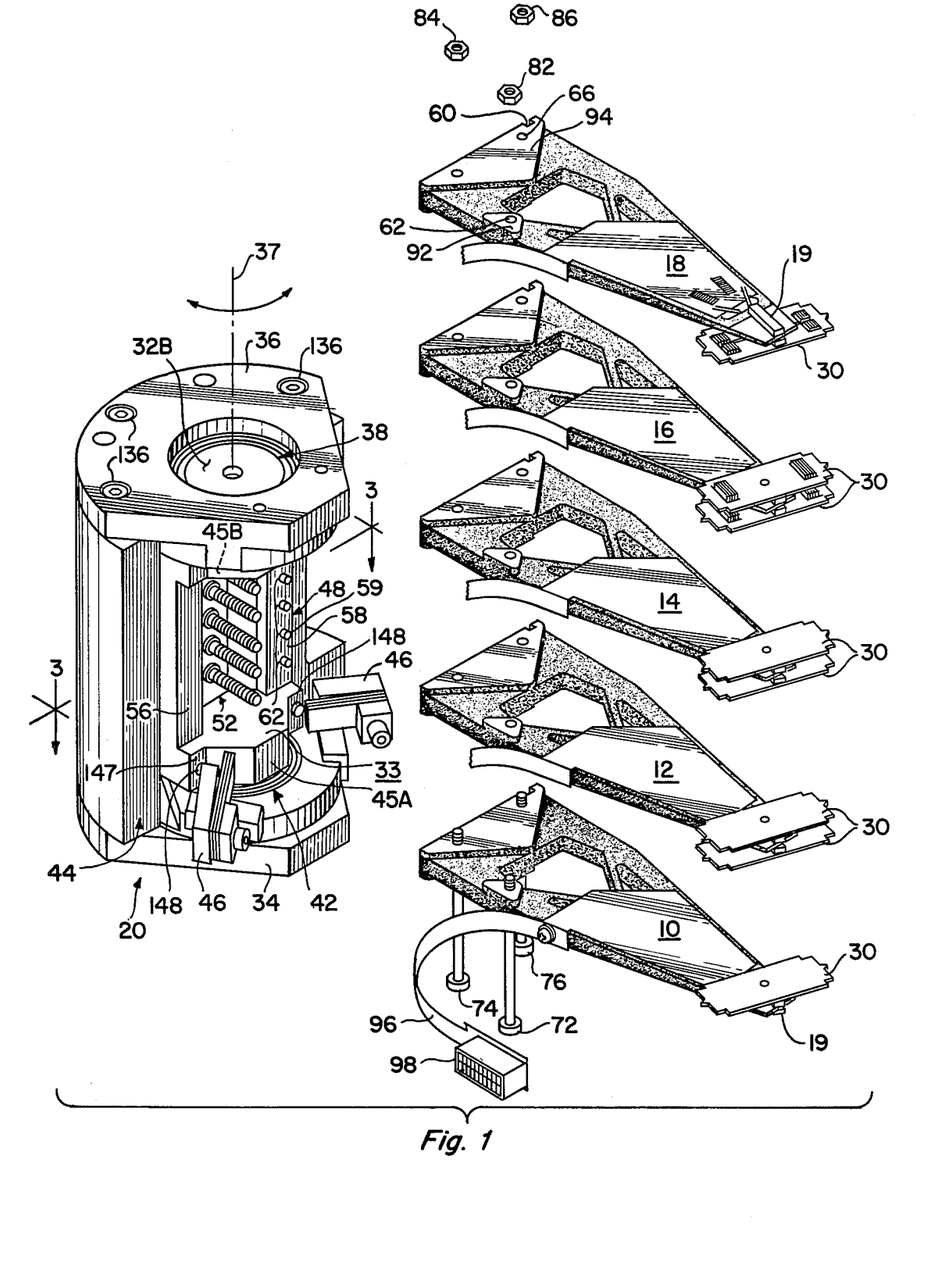
FIG. 1 is a partially exploded, isometric view showing a rotary head positioner according to the present invention, as adapted for use of five head-supporting arms.

Referring now to FIG. 1, there is shown an isometric partially exploded view of a rotary head positioner according to the present invention. As shown therein, the assembly is adapted for use in a multiple disk recording system having four disks and, therefore, has five head-supporting arms 10-18. For clarity, the disks are not shown in FIGS. 1-3. A rotary actuator motor 20 moves the arms to the desired position. At the end of each arm 10-18 there is mounted one (for arms 10 and 18) or two (for arms 12, 14 and 16) dual transducer support assemblies 30 according to the aforementioned application Ser. No. 126,020. In use, the lower-most disk of the stack, not shown, is situated between arms 10 and 12; therefore, arm 10 supports only a single pair of heads which are used in association or conjunction with the bottom surface of the lower-most disk. Each of arms 12-16, by contrast, supports two pairs of heads, one for the upper surface of the disk situated below the arm and one for the lower surface of the disk situated above the arm. Arm 18 supports only a single pair of heads for operation in association with the top surface of the upper-most disk of the stack. A balance weight 19 is used in conjunction with the single pair of heads on arm 18 and, likewise, on arm 10.

Actuator motor 20 comprises a pivotable rotor member 32 mounted between a bottom plate 34 and a top plate 36 for rotation about an axis 37 on bearings 38 and 42. Rotational motion of rotor 32 occurs relative to an arcuate stator member 44 which is fixed between bottom and top plates 34 and 36, respectively. The rotor has an elongate shape along axis 37, terminated by a bottom end member 45A and a similar top end member 45B. Stub shafts 32A and 32B extend outwardly from each of end members 45A and 45B, along axis 37, for rotational support in bearings 42 and 38, respectively. A pair of crash stops 46 are affixed to bottom end cap 34 to limit the rotation of rotor 32 relative to stator 44. The operation and construction of these crash stops is detailed below.

Rotor 32 is provided with a mounting face 48 to which the arms 10-18 are secured. Mounting face 48 has a recessed central portion 52 from which mounting bolts, such as bolt 54, project. One mounting bolt is provided for each arm. Each arm has a threaded hole to receive the bolt, which may be screwed into the arm to pull the facing end of the arm against flat side faces 56 and 58, on opposite sides of recess 52 of mounting face 48. In addition, for each of arms 10-18, side face 58 of rotor mounting face 48 is provided with a coiled spring 59 projecting therefrom. Spring 59 is a rolled up spiral of sheet metal, such as the "Spirol" pin brand of spring sold by CEM Co., Inc. of Danielson, Conn. A recess 60 is provided in the end of the arm to receive coiled spring 59; the recess contains a chamfered end, so that spring 59 is radially compressed into recess 60 when the arm is pulled tight against faces 56 and 58. The coiled springs press against the sides of the slots 60 in the arms so that arms 10-18 are mounted under tension, in a cantilevered fashion, on the central mounting bolts. The springs assist in compensating for the thermal variations in the forces between the respective arms and faces 56 and 58, to prevent slippage of the arms relative to the rotor. The springs and, therefore, their thermal coefficients, are identical, so that arms 10-18 are maintained in precise vertical lateral alignment despite temperature variations. Springs 59 also provide alignment of the arms on mounting face 48. A solid pin may be substituted for spring 59 if it is sufficient to prevent sideways slippage of the arms and compensation for temperature gradients and changes is not needed.

Arms 10-18 are identical to one another, although they may carry different combinations of head assemblies. In addition to being mounted onto rotor 32, arms 10-12 are bound to each other, as a unit. For this purpose, each of the arms is provided with three vertical holes therethrough, i.e., holes 62-66 indicated on arm 18. Bolts 72-76 are then passed through the holes in each of the arms and nuts 82-86 are threaded thereover and turned fast. In order to increase the rigidity of the structure without adding significant weight, and to keep the arms in a spaced apart relationship to accommodate the disks therebetween, each arm is provided with flat, raised, triangular-shaped mounting surfaces or pads 92 and 94. Mounting pad 92 is provided on only one side of the arm, to permit disk entry on the opposite side of the arm; mounting surface 94 is provided on the end of the arm proximate rotor 32. When the arms are assembled together, these mounting surfaces provide the contact area between the arms.

The portion of each arm proximate the heads is covered with a thin sheet of plastic, nylon or similar material which serves as a substrate to carry printed circuit lines to and from the head mounts 30. These printed circuit conductors are attached to the leads from the heads. A ribbon cable 96 ending in connector 98 is also connected to the printed circuit lines to carry signals back to a conventional signal generating or receiving device (not shown).

Figure 2A:
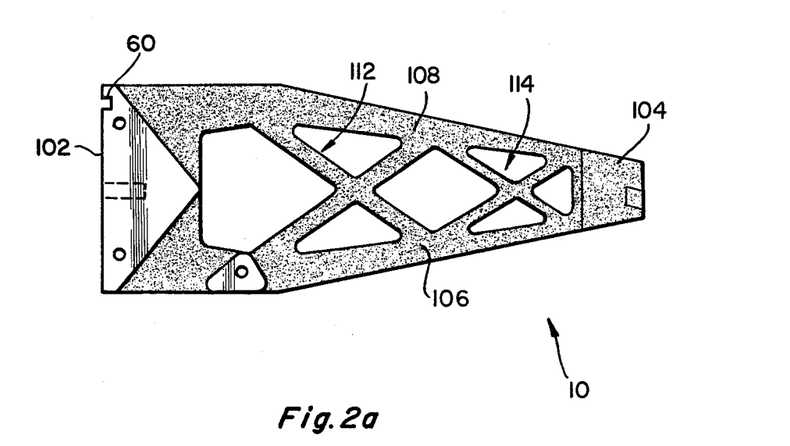
FIGS. 2A and 2B are, respectively, top plan and side plan views of an actuator arm of the present invention.
Figure 2B:
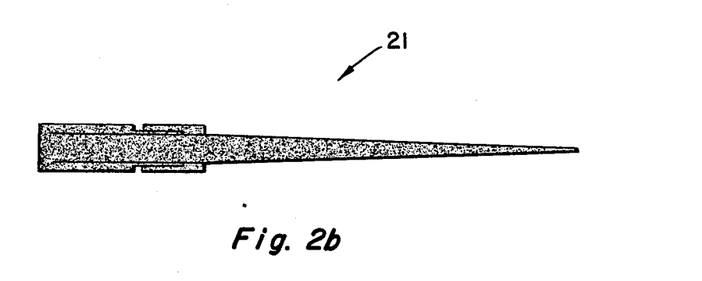

FIGS. 2A and 2B provide a detailed top and side view, respectively, of a typical arm 10. The arm is made of a suitable low density material, such as aluminum, and tapers from a first end 102 adapted to be secured to the rotor to a second end 104 on which the head suspension assemblies are mounted. As shown in the figures, the arm tapers in both width and thickness, to minimize mass and inertia. The necessary rigidity is provided by a truss-work design comprising side members 106 and 108 which are joined by a first and second pair of symmetrical x-shaped cross braces 112 and 114, respectively. Suitable proportions for arm 10 are given in FIGS. 2A and 2B.

Figure 3:
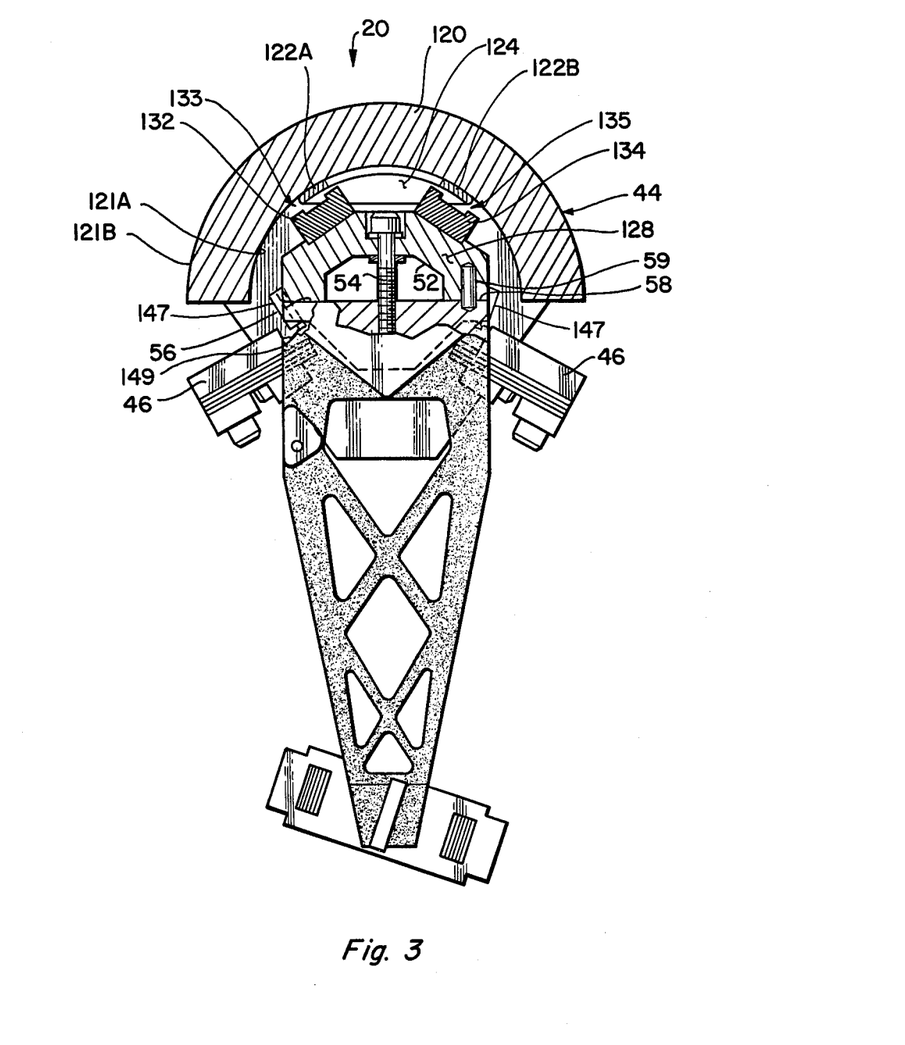
FIG. 3 is a sectional view of the positioner of FIG. 1, taken along the line 3—3' thereof.

In FIG. 3, there is shown a cross-section of the actuator motor 20 along line 3—3' of FIG. 1, with an arm attached thereto.

The stator 44 includes a stator magnet comprising a core element 120, having arcuate inner and outer surfaces 121A and 121B, respectively. A coil 124 is mounted on arms 122A and 122B on the inner surface 121A of the stator core. The rotor 32 comprises a substantially U-shaped (or, alternatively, arcuately- or semi-hexagonally-shaped) bracket 128 which carries a pair of permanent magnets 132 and 134 at the corners of the lower cross member of the U (or slanted sides of the semi-hexagon). Magnets 132 and 134 serve as counterweights for the arms and heads. Rotor magnets 132 and 134 extend perpendicularly to the direction of the paper in FIG. 3 for substantially the entire height of the rotor, as do also coil arms 122A and 122B. The signal used to drive the motor 20 is applied to coil 124.

The pole face of each of magnets 132 and 134 facing coil arms 122A and 122B, respectively, is flat, with a groove or channel (133 and 135, respectively) running vertically down the middle, perpendicular to the plane of the cross-section in FIG. 3. This shape reduces variations of the magnetic flux density in the magnet-coil gap, as a function of both coil current and rotational position of the rotor. With a minor amount of experimentation as to dimensions of the groove, it has been possible to achieve less than 5 percent variation in flux density over the full range of rotor rotation.

To achieve a high flux density with low mass, it is helpful to use a material such as samarium-cobalt for magnets 132 and 134.

Mounting bolt 54, which secures the arm to the rotor, is inserted through the back of the rotor, in the lower cross member of the "U"-shaped bracket 128, in the region between the two rotor magnets.

End caps 34 and 36 position the rotor relative to the stator. The end caps are secured to the stator core 120 by mechanical fasteners such a bolts 136. In turn, the entire positioner may be installed in a housing assembly by bolting into end caps 34 and 36 and stator core 120. The rotor assembly is supported between the end caps in bearings 38 and 42 therein. Rather than using needle bearings as in the prior art, bearings 38 and 42 are preferably torque tube type bearings, which provide high stiffness, to resist radial motion. Pre-loading of the bearings in the axial direction is employed, to additionally stiffen the structure.

In high performance positioners, the heads typically move in excess of 50 inches per second, requiring that the heads be protected in the event of malfunctioning of the controlling circuits of the positioner mechanism. It is also typical for certain areas of the surfaces of the recording disks to be dedicated to providing servo tracking signals for use by an actuator-controlling servo system, and for other areas (termed "guard bands") radially outside and adjacent to the former servo track areas to be used for head crash stop travel. To use the disk surface most efficiently, the extent of the head crash stop travel areas must be small. Therefore, it is important to provide crash stops that will stop the heads in a short distance with acceptable deceleration characteristics. The previously mentioned velocity and the short stopping distance (typically 0.15-0.20 in., at the head) cause head decelerations on the order of 200 g. Consequently, it is necessary that crash stop operation be precisely adjustable as to load force and initial contact position. The crash stop shown herein meets all of these requirements.

Figure 4:
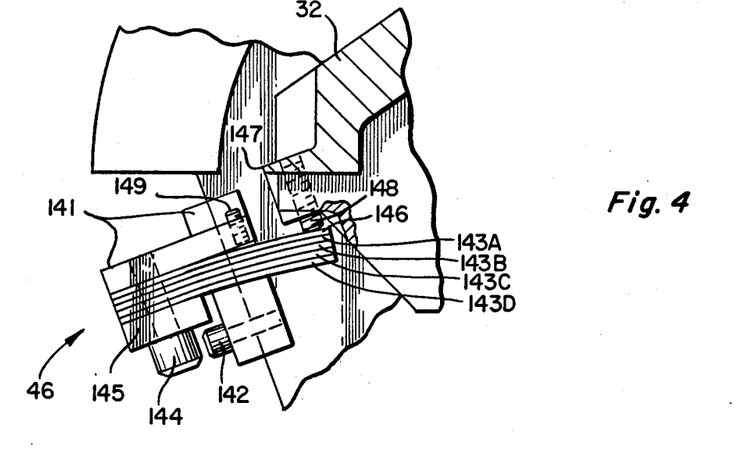
FIG. 4 is a top plan view of a crash stop according to the present invention, with co-acting portions of the lower cap and rotor of the actuator shown broken off.
Figure 5:
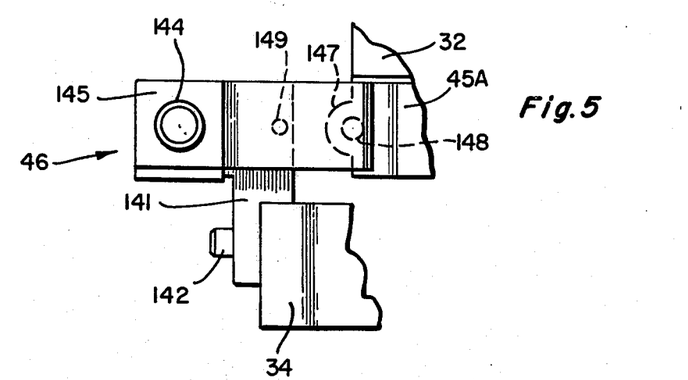
FIG. 5 is a front view of the apparatus of FIG. 4.

Referring now to FIGS. 4 and 5, the crash stops 46 are shown in greater detail than previously. Specifically, FIG. 4 shows a top view of one crash stop, a portion of the bottom end cap 34 to which it is attached, and a portion of the rotor 32 with which it interacts. A front view is given in FIG. 5. Each crash stop 46 includes a bracket 141 which is secured to the side of bottom cap 34 by a screw 142. Several cantilevered springs (e.g., leaf springs 143A-D) are secured to bracket 141 by a screw 144 and clamp plate 145, providing a laminated stack. A non-magnetic spacer 146 (of, for example, beryllium copper) is interspersed between springs 143 A-D and bracket 141, to prevent generation of magnetic debris when the rotor impacts the crash stop. The spacer 146 contributes little or no spring force to the crash stop.

Rotor bottom end member 45A is provided (on each side thereof) with a side boss 147 which cooperates with the associated crash stop. More precisely, a screw 148 is threaded into boss 147 and this screw cooperates with the crash stop. The screw 148 may be advanced into or retracted from boss 147 to adjust the postion of the heads when initial contact is made between the rotor and the crash stop. For providing an adjustable preload force on springs 143A-D, a screw 149 is threaded into bracket 141.

Figure 6:
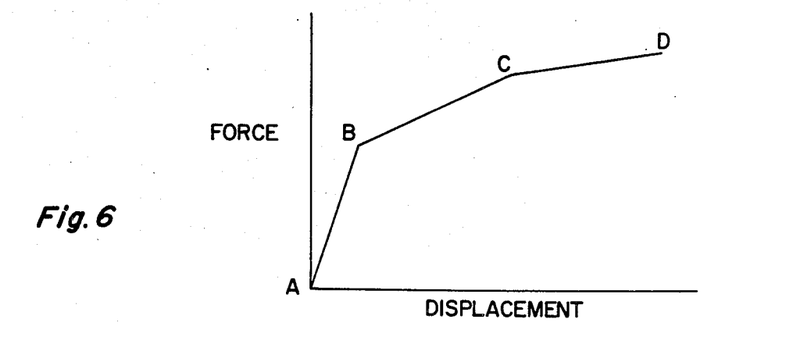
FIG. 6 is a graph showing the load force generated by the springs of the crash stop of FIGS. 4 and 5, as a function of displacement.

Operationally, the crash stop is described FIG. 6, which depicts the spring force generated by displacement of springs 143A-D from their rest, pre-load position. The pre-load condition is represented by the A-B portion of the graph. When crash stop action is required, the movement of rotor 32 advances screw 148 in boss 147 until screw 148 contacts the spring stack 143A-D. The decelerating load force indicated by section B-C in FIG. 6 then operates upon the rotor/arms/heads until the spring stack is moved out of contact with screw 149 at point C The decelerating load next imposed upon rotor 32 is shown by section C-D of the curve in FIG. 6. By the time that force represented by point D is reached, head velocity and deceleration will be zero. The spring force is thus varied progressively, to control deceleration.

The crash stops may also be used to check that certain portions of the postioner control electronics are working correctly. For this purpose, the servo head must be capable of precise location in the inner and outer guard bands. Screws 148 in bosses 147 are adjusted to position the servo head on the inner or outer guard band areas of the servo disk without interference with the crash stop mechanisms.

Figure 7:
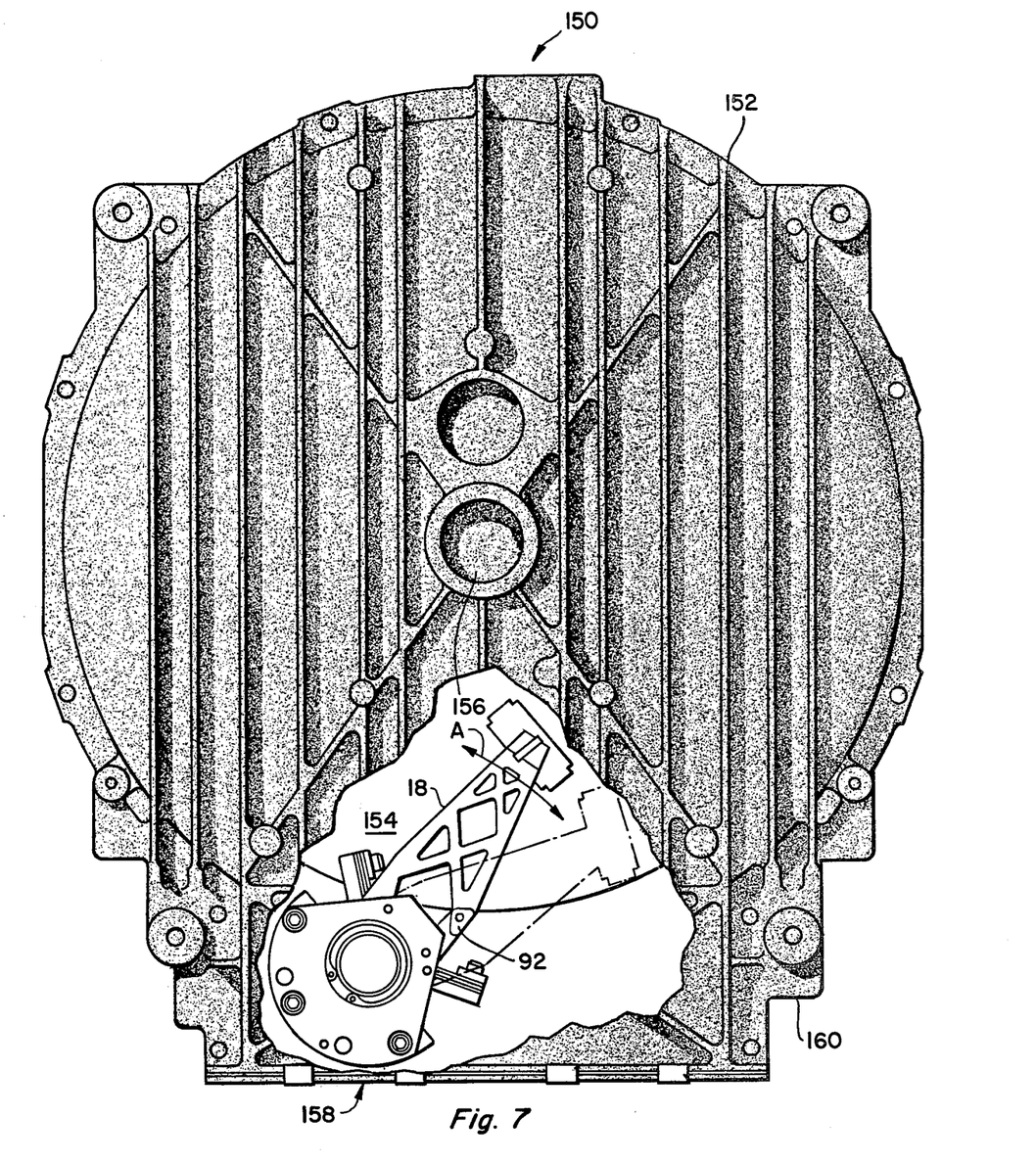
FIG. 7 is a top plan view of a disk package assembly, partially cut away, showing a positioner and arm assembly according to the invention, as intended for use.

FIG. 7 illustrates the positioner and arm assembly in use in a disk package. The disk package shown is described and claimed in U.S. patent application Ser. Nos. 126,024, and 126,022, respectively entitled DISK HOUSING FOR DISK DRIVE MASS STORAGE UNIT, and DISK HUB WITH INTEGRAL AIR FILTER FOR DISK DRIVE MASS STORAGE UNIT, filed on even date herewith and assigned to the assignee of the present invention. The disk package 150 includes a housing 152 supporting disks 154 to pivot on a spindle 156. The positioner 158 is mounted in an extension housing 160 outside the disk, so that the axis is parallel to the axis of rotation of the disks on spindle 156. The positioner pivots the arms between an outer guard band position, shown in broken lines in FIG. 7, and a inner guard band position (e.g., the position indicated in solid lines) where either one of the two heads can access selected track areas on the disk, to read or write thereon. The pivoting of the arm is indicated by arrow A. Two heads are provided in each mount to further reduce the access time for the heads on the disk.

The actuator thus provided has a great number of highly advantageous properties and characteristics. Inertia is extremely low, since the rotor need only move a pair of magnets mounted on a small radius, rather than coil assembly mounted on a large radius. Inertia is further maintained at a low level due to the low mass and low inertia of the actuator arm. Moreover, the mass of the rotor and arm can be carefully adjusted to balance each other about axis 37, to minimize the imbalance forces. Most importantly, the rotor has high stiffness which yields high natural frequencies of vibration.

The use of torque tube bearings, a pair at each end of the rotor, in end caps 34 and 36, provide an extremely high degree of radial stiffness and, therefore, allows high performance and fast operation of the motor without incurring excitation of unwanted mechanical resonances. The bearings are pre-loaded so as to maintain the system's stiffness over a wide temperature range. Such structural rigidity and radial stiffness make this actuator ideal for use in high density disk drives. The maintenance of close mechanical tolerances is enhanced by the ease with which the motor axis may be kept in parallel alignment with the disk spindle, so that high track densities may be achieved.

Magnetic field leakage from the motor is low, so as not to interfere with the recording of information on disks in the disk drive, since the stator shields the permanent magnets.

Additionally, the parts count of this positioner is low and no unconventional fabrication techniques are needed, so that manufacturing cost is not excessive.

It will thus be seen that the objects set forth above, among those made apparent from the preceding description, are efficiently attained. And, since certain changes may be made in the above construction without departing from the scope of the invention, it is intended that all matter contained in the above description or shown in the accompanying drawings be interpreted as illustrative only, and not in a limiting sense.

It is also to be understood that the following claims are intended to cover all of the generic and specific features of the invention herein described.

What is claimed as new and desired to be secured by Letters Patent of the United States is:

1. An assembly for moving a read/write recording head over the surface of a magnetic disk recording medium, the recording medium being supported by spindle means for rotating the medium about a spindle axis that is perpendicular to the plane of rotation of the recording medium, the spindle means being supported by a base, the assembly comprising:
    an actuator arm having a pivotal end at one extremity and a head supporting end at the other extremity for supporting the head;
    an actuator motor comprising a stator and a rotor, the rotor being rotatable about a rotor axis that is parallel to said spindle axis, the rotor being connected to the pivotal end of the actuator arm for pivotally moving the actuator arm through a predefined limited angular range about the rotor axis;
    the rotor including a pair of permanent magnets, and the stator being mounted on said base and having opposed shaft receptors for supporting the rotor, said stator including at least one electro-magnet having at least one coil for energization to produce an electromagnetic force between the stator and the rotor, to produce movement of the rotor about said rotor axis; the rotor including
    an elongated member having a substantially U-shaped cross-sectional area in the plane normal to the rotor axis;
    a pair of aligned stub shaft members located on said rotor axis, one disposed at each end of and connected to the elongated U-shaped member, for use as a shaft for rotation and support of the U-shaped member within the shaft receptors of said stator;
    the end surfaces of the open side of the U-shaped member providing mounting surfaces located intermediate said stub shaft members for securing the arm thereagainst;
    the actuator arm having a mounting surface at one end thereof adapted to be secured to the U-shaped member of the rotor;
    the permanent magnets of the rotor being of elongated configuration, disposed parallel to the rotor axis and being fixed to the outside of the U-shaped member;
    the stator including a stator core that is arcuately shaped thereby to embrace the area of travel of said permanent magnets and a stator coil wound about the stator core;
    said permanent magnets being formed to produce a substantially constant magnetic flux density between said permanent magnets and said stator core over the rotational range of the rotor.

2. The assembly of claim 1 further including a bolt for securing the arm to the rotor, and wherein the U-shaped member is provided with a hole therethrough, at the bottom side of the U, said hole being large enough to permit passage of the shank of the bolt therethrough but small enough to prevent passage of the head of the bolt, and further wherein the end of the actuator arm adjacent the mounting surface is provided with a threaded hole adapted to receive the bolt, the bolt being passed through the hole in the U-shaped member and threaded into the hole in the arm such that the arm is pulled tight against the U-shaped member by the screwing of the bolt into the arm.

3. The assembly of claim 1 or claim 2 wherein the pole face of each of the permanent magnets of the rotor element facing the stator is flat and has a U-shaped groove therein running along the length of the magnets, parallel to the motor axis of the rotor,
    whereby a substantially constant magnetic flux density is provided in the permanent magnet-coil gap, over the rotational range of the rotor.

4. The assembly of claim 1 or claim 2 further including means for preventing slippage of the actuator arm mounting surface relative to the rotor.

5. The assembly of claim 4 wherein the slippage prevention means includes a slot in the arm and a cooperating member extending from the face of the rotor to be received in the slot.

6. The assembly of claim 1 or 2 further including a second actuator arm and a second bolt for securing the second arm to the rotor, U-shaped member being provided with a second hole therethrough for passage of the second bolt, and the second arm having a threaded hole adapted to receive the second bolt, and the assembly also including means for maintaining both actuator arms in aligned, spaced apart relationship over a range of temperatures to be encountered.

7. The assembly of claim 6 wherein the alignment maintaining means includes, for each arm, a slot in the arm in the mounting surface thereof, a spring extending from the rotor toward the mounting surface of the arm, to one side of the associated bolt, in alignment with the slot, the slot having a chamfered end adapted to compress radially the spring when the arm is secured to the rotor, and wherein the spring for each arm is identical to the spring for the other arm.

8. The assembly of claim 7 wherein each arm includes a slot adapted to receive and laterally retain the associated spring.

9. In a magnetic disk storage device which includes a magnetic disk medium, spindle means for rotating the disk medium about a spindle axis that is perpendicular to the plane of rotation of the disk medium, a base for supporting the spindle means, and at least one actuator arm having a pivotal end at one extremity and a head supporting end at the other extremity for supporting at least one transducer means mounted thereon, said arm being pivotally movable through a limited angle of rotation about a pivotal axis that is parallel to said spindle axis, a motor for connection to said actuator arm comprising:

a stator mountable on said base and including a stator core that is arcuately shaped to substantially embrace a rotor axis that is coincident with said pivotal axis, said stator including opposed shaft receptors aligned with said rotor axis;

a rotor having opposed shaft members supported by said shaft receptors and being rotatable about said rotor axis through a limited angle corresponding to the pivotal movement of the actuator arm;

at least one permanent magnet fixed to the rotor, the area of travel of the permanent magnet being embraced by said stator core during rotational movement of the rotor throughout the angle of rotation;

at least one electromagnetic coil fixed to the stator core;

said permanent magnet and said stator core being formed to produce a substantially constant electromagnetic force throughout the angle of rotation of said rotor;

the rotor including coupling means disposed intermediate said opposed shaft members for coupling to said actuator arm thereby to effect motion of said arm to position said transducer means over said magnetic disk medium upon movement of said rotor.

10. The positioner motor of claim 9 wherein the permanent magnet is of elongate shape, with its length disposed parallel to the axis of rotation of the rotor, the pole face of the magnet facing the stator having a flat surface with a U-shaped groove running the length of the magnet, in the direction of the axis.

11. An assembly for moving a read/write recording head over the surface of a magnetic data storage medium, the assembly including spindle means for rotating said recording medium about a spindle axis that is perpendicular to the plane of rotation of the recording medium, the spindle means having opposed axial ends, and medium enclosure means having opposed mating members, each member being a unitary rigid structure for encasing said recording medium and for supporting each of the opposed ends of the spindle means on respective opposed members thereof to allow rotation of the spindle means but to prevent radial displacement thereof, the assembly further comprising:

an actuator arm having a pivotal end at one extremity and a head supporting end at the other extremity for supporting the head;

an actuator motor comprising a rotor for pivotally moving the arm about a rotor axis through a predefined limited angular range and a cooperating stationary stator, the rotor including a pair of permanent magnets, the stator having opposed shaft receptors for supporting the rotor wherein each of the opposed shaft receptors is secured to a respective member of said medium enclosure means, thereby to constrain the rotor axis in fixed parallel relation to the spindle axis, said stator including at least one electromagnetic coil for energization to produce an electromagnetic force between the stator and the rotor, to produce movement of the rotor about said rotor axis; the rotor including an elongated member having a substantially U-shaped cross-sectional area in the plane normal to the rotor axis;

a pair of aligned stub shaft members located on said rotor axis, one disposed at each end of and connected to the elongated U-shaped member, for use as a shaft for rotation and support of the U-shaped member within the shaft receptors of said stator;

the end surfaces of the open side of the U-shaped member providing mounting surfaces located intermediate said stub shaft members for securing the arm thereagainst;

the actuator arm having a mounting surface at the pivotal end thereof adapted to be secured to the U-shaped member of the rotor;

the permanent magnets of the rotor being of elongated configuration, disposed parallel to the motor axis and being fixed to the outside of the U-shaped member;

the stator including a stator core that is arcuately shaped to substantially embrace said rotor axis and the area of travel of said permanent magnets and a stator coil wound about the stator core, and said permanent magnets being formed for producing a substantially constant magnetic flux density between said permanent magnets and said stator core over the rotational range of the rotor.

* * * * *